(12) United States Patent
Schmeltzer et al.

(10) Patent No.: US 8,563,648 B2
(45) Date of Patent: Oct. 22, 2013

(54) COATING COMPOSITION COMPRISING AN ALKOXYSILANE, A POLYSILOXANE, AND A PLURALITY OF PARTICLES

(75) Inventors: Robert Schmeltzer, Coraopolis, PA (US); Susan Donaldson, Allison Park, PA (US); Kevin C. Olson, Wexford, PA (US); Kurt G. Olson, Gibsonia, PA (US); John E. Schwendeman, Wexford, PA (US); Dennis A. Simpson, Sarver, PA (US); Frank C. Williams, Freeport, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 513 days.

(21) Appl. No.: 12/607,734

(22) Filed: Oct. 28, 2009

(65) Prior Publication Data

US 2011/0098394 A1 Apr. 28, 2011

(51) Int. Cl.
*C08L 83/04* (2006.01)
(52) U.S. Cl.
USPC .......................................... 524/588; 528/901
(58) Field of Classification Search
USPC .......................................... 524/588; 528/901
See application file for complete search history.

(56) References Cited

U.S. PATENT DOCUMENTS

| | | | |
|---|---|---|---|
| 3,317,460 A | | 5/1967 | Clark et al. |
| 3,517,001 A | * | 6/1970 | Abe .............................. 544/221 |
| 5,066,720 A | | 11/1991 | Ohsugi et al. |
| 5,223,495 A | | 6/1993 | Inoue et al. |
| 6,087,438 A | | 7/2000 | Herber et al. |
| 6,204,331 B1 | | 3/2001 | Sullivan et al. |
| 6,225,434 B1 | | 5/2001 | Sadvary et al. |
| 6,657,001 B1 | * | 12/2003 | Anderson et al. ............. 524/588 |
| 7,652,119 B2 | * | 1/2010 | Wakabayashi et al. ......... 528/36 |
| 2004/0266925 A1 | | 12/2004 | Shiono |
| 2005/0288415 A1 | | 12/2005 | Beers et al. |
| 2008/0047469 A1 | | 2/2008 | Poppe et al. |
| 2008/0057207 A1 | | 3/2008 | Poppe et al. |
| 2008/0139733 A1 | | 6/2008 | Andreas et al. |

FOREIGN PATENT DOCUMENTS

| | | |
|---|---|---|
| EP | 0735118 A1 | 10/1996 |
| EP | 1967550 A1 | 9/2008 |
| WO | 2006 051799 * | 5/2006 |

* cited by examiner

*Primary Examiner* — Kuo-Liang Peng
(74) *Attorney, Agent, or Firm* — Krisanne Shidgler

(57) ABSTRACT

The present invention is directed to a coating composition, such as a substantially clear coating composition, which comprises (1) an alkoxysilane, (2) a polysiloxane, (3) a plurality of particles, and (4) curing agent that is reactive with the polysiloxane. The coating composition of the present invention can exhibit increased physical properties, such as scratch resistance, when compared to similar coating compositions that lack the components disclosed herein.

13 Claims, No Drawings

COATING COMPOSITION COMPRISING AN ALKOXYSILANE, A POLYSILOXANE, AND A PLURALITY OF PARTICLES

BACKGROUND OF THE INVENTION

1. Field of the Invention

The present invention relates generally to coating compositions comprising an alkoxysilane, a polysiloxane, and a plurality of particles.

2. Background Information

Color-plus-clear coating systems, which involve the application of a colored or pigmented basecoat to a substrate followed by application of a transparent or clear top coat (clearcoat) over the basecoat, are typically used as original finishes for automobiles manufactured in the automotive OEM industry. These color-plus-clear systems possess outstanding appearance properties such as gloss and distinctness of image due in large part to the clearcoat.

Because the clearcoat is the outermost coating layer on such a coating system, it is susceptible to damage from numerous environmental elements. These elements include acidic precipitation, exposure to ultraviolet radiation from sunlight, high relative humidity and temperatures, and defects due to impact with small, hard objects resulting in chipping and scratching of the coating surface.

Typically, a clearcoat having a harder more highly crosslinked film may exhibit improved scratch resistance, but it is much more susceptible to chipping and/or thermal cracking due to embrittlement of the film resulting from a high crosslink density. A softer, less crosslinked film, while not prone to chipping or thermal cracking, is susceptible to scratching, water spotting and acid etch due to a low crosslink density of the cured film. There is, accordingly, a need for an improved clearcoat.

SUMMARY OF THE INVENTION

In one embodiment, the present invention is directed to a coating composition comprising:

(a) a compound comprising a reactive group of structure (I)

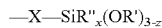

$$—X—SiR''_x(OR')_{3-z} \qquad (I)$$

wherein X is a hydrocarbon chain; wherein x=0 to 2 and z=0 to 2; wherein each R' and R" comprise independently hydrogen, a halogen, an amide, a hydrocarbon chain, carboxy, alkoxy, a hydrocarbon chain comprising a heteroatom, and/or a hydrocarbon chain comprising a carbonyl group; and wherein when x is 2, then each R" may be the same or different; and wherein when z is 0 or 1, then each R' may be the same or different;

(b) a polysiloxane comprising a reactive functional group that comprises at least one of the following structural units (II):

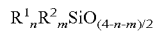

$$R^1_n R^2_m SiO_{(4-n-m)/2} \qquad (II)$$

wherein $R^1$ is hydrogen, hydroxyl, a hydrocarbon group, or a siloxane chain; $R^2$ comprises a functional group; and wherein m and n fulfill the requirements of 0<n<4, 0<m<4 and 2<(m+n)<4; and wherein when n>1, then each $R^1$ may be the same or different; and wherein when m>1, then each $R^2$ may be the same or different;

(c) a reactant comprising a functional group that is reactive with component (b); and (d) a plurality of particles selected from inorganic particles, composite particles and mixtures thereof.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10. As employed herein, the term "number" means one or an integer greater than one.

As used herein, plural phrases or terms encompasses their singular counterparts and vice versa, unless specifically stated otherwise. By way of illustration, and not limitation, although reference is made herein to "a" polysiloxane, "an" alkoxysilane, "a" reactant comprising a functional group; a plurality of these materials may be used in the present invention. As used herein, "plurality" means two or more.

As used herein, "includes" and like terms means "including without limitation."

As used herein, the use of "or" means "and/or" unless specifically stated otherwise, even though "and/or" may be explicitly used in certain instances.

As used herein, "molecular weight" means weight average molecular weight (Mw) as determined by Gel Permeation Chromatography.

Unless otherwise indicated, as used herein, "substantially free" means that a composition comprises ≤1 weight percent, such as ≤0.8 weight percent or ≤0.5 weight percent or ≤0.05 weight percent or ≤0.005 weight percent, of a particular material (e.g., organic solvent, filler, etc. . . . ) based on the total weight of the composition.

Unless otherwise indicated, as used herein, "completely free" or "free of" means that a composition does not comprise a particular material (e.g., organic solvent, filler, etc. . . . ). That is, the composition comprises 0 weight percent of such material.

As used herein, the term "cure" refers to a process wherein the crosslinkable components of a coating are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Reference to any monomer(s) herein refers generally to a monomer that can be polymerized with another polymerizable component such as another monomer or polymer. Unless otherwise indicated, it should be appreciated that once the monomer components react with one another to form a compound, the compound will comprise the residues of such monomer components.

Coating Composition

The present invention is directed to a coating composition that can be used alone or as part of a coating system such as those described below. In certain embodiments, the coating composition disclosed herein is used in a color-plus-clear coating system. In some embodiments, the coating composition of the present invention is used as the clearcoat coating composition in such a system. As will be described in greater detail below, the coating composition can exhibit one or more increased physical properties, such as scratch resistance, when compared to similar coating compositions that lack the components disclosed herein.

Component (a):

The coating composition of the present invention comprises a compound comprising a reactive group of structure (I)

$$-X-SiR''_x(OR')_{3-z} \quad (I)$$

wherein X comprises a hydrocarbon chain; wherein x=0 to 2 and z=0 to 2; wherein R' and R" comprises hydrogen, a halogen, an amide, a halogen, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R" may be the same (identical) or different; and wherein when z is 0 or 1, then each R' may be the same or different.

As used herein, a "hydrocarbon chain" (hydrocarbon group) means a chain comprising a backbone repeat unit based on carbon and hydrogen. The hydrocarbon chain can be branched or unbranched, acyclic or cyclic, saturated or unsaturated, or aromatic, and can contain from 1 to 24 carbon atoms or in the case of an aromatic group from 3 to 24 carbon atoms. Non-limiting examples of such hydrocarbon chains include alkyl, alkoxy, aryl, alkaryl, alkoxyaryl, aralkyl, or combinations thereof. Nonlimiting examples of lower alkyl chains include, for example, methyl, ethyl, propyl, and butyl chains. As used herein, "lower alkyl" refers to alkyl chains having from 1 to 6 carbon atoms. One or more of the hydrogen atoms and/or carbon atoms of the hydrocarbon chain can be substituted with heteroatoms. As used herein, "heteroatom" means elements other than carbon, for example, oxygen, nitrogen, sulfur, halogen atoms, or combinations thereof.

In some embodiments, the hydrocarbon chain comprises a heteroatom, such as those described above. Accordingly, in certain embodiments, R' of formula (I) can be $-CH_2-CH_2-CH_2-O-CH_2-CH_3$.

As stated above, the hydrocarbon chain may also comprise a carbonyl group. Accordingly, in certain embodiments, R' of formula (I) can be $-C(O)-CH_2-CH_2-O-CH_2-CH_3$.

In certain embodiments, R' and R" of structure (I), which may be the same or different, comprise an alkyl of $C_1$ to $C_6$ carbons.

In some embodiments, X of structure (I) comprises an alkyl of $C_2$ to $C_6$.

In some embodiments, the compound is an alkoxysilane compound that comprises a (poly)ester, a (poly)urethane, an isocyanurate, a (poly)urea, a (poly)epoxy, an anhydride, an acrylic, a (poly)ether, a (poly)sulfide, a (poly)amine, or combinations thereof. In certain embodiments, the isocyanurate comprises structure (Ia), (Ib), (Ic), or combinations thereof:

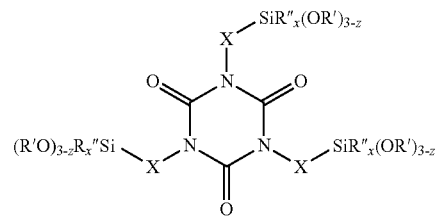
(Ia)

wherein X comprises a hydrocarbon chain; wherein x=0 to 2 and z=0 to 2; wherein R' and R" comprises hydrogen, a halogen, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R" may be the same or different; and wherein when z is 0 or 1, then each R' may be the same or different.

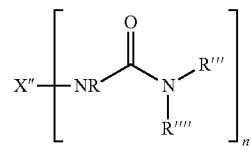
(Ib)

wherein R comprises hydrogen, a hydrocarbon chain, a hydrocarbon chain comprising a heteroatom, and/or a hydrocarbon chain comprising a carbonyl group; wherein at least one of R''' and R'''' is $-X-SiR''_x(OR')_{3-z}$ (as defined above) and wherein R''' and R'''', which may be the same or different, can also comprise hydrogen, a hydrocarbon chain, a hydrocarbon chain comprising a heteroatom, a hydrocarbon chain comprising a carbonyl group, a (poly)ester, a (poly)urethane, an isocyanurate, a (poly)urea, a (poly)epoxy, an anhydride, an acrylic, a (poly)ether, a (poly)sulfide, a (poly)amine, or combinations thereof;
wherein X" a hydrocarbon chain, a (poly)ester, a (poly)urethane, an isocyanurate, a (poly)urea, a (poly)epoxy, an anhydride, an acrylic, a (poly)ether, a (poly)sulfide, and/or a (poly)amine; and wherein n is ≥1, such as ≥2.

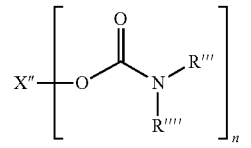
(Ic)

wherein at least one of R''' and R'''' is $-X-SiR''_x(OR')_{3-z}$ (as defined above) and wherein R''' and R'''', which may be the same or different, can also comprise hydrogen, a hydrocarbon chain, a hydrocarbon chain comprising a heteroatom, a hydrocarbon chain comprising a carbonyl group, a (poly)ester, a (poly)urethane, an isocyanurate, a (poly)urea, a (poly)epoxy, an anhydride, an acrylic, a (poly)ether, a (poly)sulfide, a (poly)amine, or combinations thereof; wherein X" a hydrocarbon chain, a (poly)ester, a (poly)urethane, an isocyanurate, a (poly)urea, a (poly)epoxy, an anhydride, an acrylic, a (poly)ether, a (poly)sulfide, and/or a (poly)amine; and wherein n is ≥1, such as ≥2.

Structures (Ia), (Ib) and (Ic) can be made using techniques that are known in the art. In certain embodiments, however, structure (Ia) can be the reaction product of an isocyanate functional silane such as 3-isocyanatopropyl trimethoxysilane which has been trimerized using methods that are known in the art. In other embodiments, structure (Ia) can be the reaction product of phosgene with an aminosilane compound such as gamma-aminopropyltrimethoxy silane. In certain embodiments, structure (Ib) can be the reaction product of an isocyanate functional compound, such as hexamethylene diisocyanate, with an aminosilane compound such as those described above. In certain embodiments, structure (Ic) can be the reaction product of a hydroxyl functional compound, such as hexanediol, with an isocyanate functional silane such as those described above. The reaction parameters, such as the amount of reactants and temperatures, used to form structures (Ia), (Ib) and (Ic) via the various reactants described in this paragraph.

In certain embodiments, the total amount of component (a) in the coating composition ranges from 1 weight percent to 50 weight percent based on the total resin solids of the coating composition. In some embodiments, the total amount of component (a) in the coating composition ranges from 10 weight percent to 45 weight percent based on the total resin solids of the coating composition. In other embodiments, the total amount of component (a) in the coating composition ranges from 15 weight percent to 25 weight percent based on the total resin solids of the coating composition.

Component (b):

As stated above, the coating composition of the present invention comprises (b) a polysiloxane that comprises at least one of the following structural units (II):

wherein $R^1$ comprises hydrogen, hydroxyl, a hydrocarbon chain, or a siloxane chain; wherein $R^2$ comprises a functional group; and wherein m and n fulfill the requirements of $0 \leq n < 4$, $0 < m < 4$ and $2 < (m+n) < 4$; and wherein when $n > 1$, then each $R^1$ may be the same or different; and wherein when $m > 1$, then each $R^2$ may be the same or different. In certain embodiments, the functional group of $R^2$ comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

As used herein, "siloxane chain" means a chain comprising a backbone comprising two or more —SiO— groups. For example, the siloxane groups represented by $R^1$ can be branched or unbranched, and linear or cyclic. The siloxane groups can be substituted with pendant organic substituent chains, for example, alkyl, aryl, and alkaryl chains. The organic substituent groups can be substituted with heteroatoms, for example oxygen, nitrogen, and a halogen atom, a functional groups (as described in connection with $R^2$ of Structure (II) above), or combinations thereof.

In some embodiments, the polysiloxane comprises structure (III) or (IV):

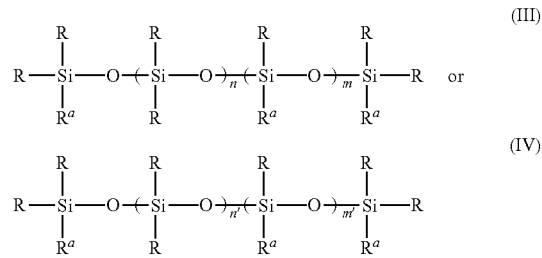

wherein m=≥1; m' ranges from 0 to 75; n ranges from 0 to 75; n' ranges from 0 to 75; each R, which may be identical or different, is selected from hydrogen, hydroxyl, a hydrocarbon chain, a siloxane chain, and mixtures of any of the foregoing; and —$R^a$ comprises the following structure (V):

wherein —R3 is selected from an alkylene group, an oxyalkylene group, and an alkylene aryl group; and X represents a group which comprises at least one reactive functional group selected from a hydroxyl group, a carboxyl group, an isocyanate group; a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxyl alkylamide group, and an epoxy group.

As used herein, "alkylene" refers to an acyclic or cyclic, saturated hydrocarbon group having a carbon chain length of from $C_2$ to $C_{25}$. Nonlimiting examples of suitable alkylene groups include those described in U.S. Pat. No. 6,657,001, column 11, lines 35 to 40, the cited portion which is incorporated herein by reference.

As used herein, "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those described in U.S. Pat. No. 6,657,001, column 11, lines 44 to 49, the cited portion which is incorporated herein by reference.

As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include those described in U.S. Pat. No. 6,657,001, column 11, lines 52, to column 12, line 2, the cited portion which is incorporated herein by reference.

Formulae (III) and (IV) are diagrammatic, and are not intended to imply that the parenthetical portions are necessarily blocks, although blocks may be used where desired. In some cases the polysiloxane may comprise a variety of siloxane units.

In one embodiment, the present invention is directed to a composition as previously described wherein the substituent group $R^3$ represents an oxyalkylene group. In another embodiment, $R^3$ represents an oxyalkylene group, and X represents a group which comprises at least two reactive functional groups.

In another embodiment, the present invention is directed to any composition as previously described comprising at least one polysiloxane having the structure (III) or (IV) described above, wherein (n+m) ranges from 2 to 9. In yet another embodiment, in compositions comprising at least one polysiloxane having the structure (III) or (IV) described above, (n+m) ranges from 2 to 3. In another embodiment, in compositions comprising at least one polysiloxane having the structure (III) or (IV) described above, (n'+m') ranges from 2 to 9. In another embodiment, in compositions comprising at least one polysiloxane having the structure (III) or (IV) described above, (d+m') ranges from 2 to 3.

In one embodiment, the present invention is directed to a composition wherein X of structure (IV) represents a group comprising at least one reactive functional group selected comprising a hydroxyl group and a carbamate group. In another embodiment, the present invention is directed to a composition wherein X represents a group which comprises at least two hydroxyl groups. In certain embodiments, X can comprise a polymeric urethane or urea-containing material which is terminated with isocyanate, hydroxyl, primary or secondary amine functional groups, or mixtures of any of the foregoing. When the substituent group X comprises such functional groups, the polysiloxane can be the reaction product of a polysiloxane polyol, one or more polyisocyanates and, optionally, one or more compounds having at least two active hydrogen atoms per molecule selected from hydroxyl groups, primary amine groups, and secondary amine groups. Suitable polyisocyanates as well as suitable compounds having at least two active hydrogen atoms per molecule are described in U.S. Pat. No. 6,657,001, column 16, line 59, to column 17, line 7; column 17, lines 19 to 32; and column 17, lines 37 to 48, the cited portions of which are incorporated herein by reference. In some embodiments, X can comprise a polymeric ester-containing group which is terminated with hydroxyl or carboxylic acid functional groups. When X is such a group, the polysiloxane can be the reaction product of a polysiloxane polyol, one or more materials having at last one carboxylic acid functional group, and one or more organic polyols. Nonlimiting suitable examples of materials having at least one carboxylic acid functional group include carboxylic acid group-containing polymers well-known in the art, for example, carboxylic acid group-containing acrylic polymers, polyester polymers, and polyurethane polymers, such as those described in U.S. Pat. No. 4,681,811. Nonlimiting examples of suitable organic polyols include those described in U.S. Pat. No. 6,657,001, lines 23 to 32; U.S. Pat. No. 4,046,729, column 7, line 52, to column 8, line 9; column 8, line 29, to column 9, line 66; and in U.S. Pat. No. 3,919,315 column 2, line 64, to column 3, line 33, the cited portions of which are being incorporated herein by reference.

In certain embodiments, the (b) polysiloxane is present in the coating composition at levels ranging from 0.01 weight percent to 90 weight percent based on the total weight of the resin solids of the components used to form the coating composition. In other embodiments, the (a) polysiloxane is present in the coating composition at the levels described in U.S. Pat. No. 6,657,001, column 13, line 28, to column, 14, line 7, the cited portion of which is being incorporated herein by reference. As used herein "based on total weight of the resin solids" of the components which form the composition means that the amount of the component added during the formation of the composition is based upon the total weight of the solids (non-volatiles) of the polysiloxane, any film-forming component and any curing agent present during formation of the coating composition, but not including the particles, any solvent, or any additive solids such as hindered amine stabilizers, catalysts, photoinitiators, pigments including extender pigments and fillers, flow additives, and/or UV light absorbers.

To form a polysiloxane containing epoxy groups, a polysiloxane containing hydroxyl functional groups can be further reacted with a polyepoxide. The polyepoxide can be an aliphatic or cycloaliphatic polyepoxide or mixtures of any of the foregoing. Nonlimiting examples of polyepoxides suitable for use include epoxy functional acrylic copolymers prepared from at least one ethylenically unsaturated monomer having at least one epoxy group, for example glycidyl (meth)acrylate and allyl glycidyl ether, and one or more ethylenically unsaturated monomers which have no epoxy functionality. The preparation of such epoxy functional acrylic copolymers is described in detail in U.S. Pat. No. 4,681,811 at column 4, line 52 to column 5, line 50, the cited portion of which is being incorporated herein by reference.

Component (c):

As stated above, the coating composition of the present invention comprises a reactant comprising a functional group that is reactive with component (b). For example, component (c) may comprise a functional group that is reactive with a functional group of component (b). In some embodiments, the reactant comprises a functional group that is reactive with the functional group of (b) as well as a functional group that can react with other reactants that can also be considered as component (c).

In certain embodiments, component (c) can comprise a curing agent (crosslinking agent). Suitable curing agents include, without limitation, an aminoplast resin, a polyisocyanate, a blocked polyisocyanate, a polyepoxide, a polyacid, a polyol, or combinations thereof. Suitable aminoplast compounds that may be used in the present invention include those described in U.S. Pat. No. 6,657,001, column 26, lines 3 to 27, the cited portion of which is being incorporated herein by reference. Examples of such aminoplast compounds include CYMEL (commercially available from Cytec Industries, Inc.) and RESIMENE (available from Solutia, Inc.).

Other curing agents suitable for use in the present invention include, but are not limited to, polyisocyanate curing agents. As used herein, the term "polyisocyanate" is intended to include blocked (or capped) polyisocyanates as well as unblocked polyisocyanates. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols also can be used.

Additional curing agents that may be used in the present invention include those described in U.S. Pat. No. 6,657,001, column 26, line 62, to column 27, line 20; column 26, lines 25 to 32; column 27, lines 36 to 44; column 26, lines 48 to 60; and column 26, line 66, to column 27, line 12, the cited portion of which are being incorporated herein by reference.

In certain embodiments, the amount of curing agent in the coating composition is generally present in an amount ranging from 1 weight percent to 65 weight percent, such as from 5 weight percent to 65 weight percent, or from 10 weight percent to 45 weight percent, or from 15 weight percent to 40 weight percent, based on total weight of the resin solids of the components which form the composition.

Component (d):

As stated above, the coating composition of the present invention comprises a plurality of particles. In certain embodiments, the particles have an average particle size less than 50 microns prior to incorporation into the composition. In some embodiments, the particles have an average particle size ranging from 1 nanometer (nm) to less than 1000 nm prior to incorporation into the composition. In other embodiments, the particles have an average particle size ranging from 1 nm to 100 nm, such as from 5 nm to 50 nm, or from 5 nm to 25 nm, or from 10 nm to 20 nm, prior to incorporation into the coating composition. In certain embodiments, particles of varying sizes may be used in the present invention.

The shape (or morphology) of the particles can vary depending upon the specific embodiment of the present invention and its intended application. For example generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), Handbook of Fillers and Plastics (1987) at pages 9-10, which are specifically incorporated by reference herein.

The particles can be formed from materials selected from polymeric and nonpolymeric inorganic materials, polymeric and nonpolymeric organic materials, composite materials, and mixtures of any of the foregoing. As used herein, the term "polymeric inorganic material" means a polymeric material having a backbone repeat unit based on an element or elements other than carbon. For more information see James Mark et al., Inorganic Polymers, Prentice Hall Polymer Science and Engineering Series, (1992) at page 5, which is specifically incorporated by reference herein. As used herein, the term "polymeric organic materials" means synthetic polymeric materials, semisynthetic polymeric materials and natural polymeric materials, all of which have a backbone repeat unit based on carbon.

An "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, etc.; and carbon-containing ionic compounds such as metallic carbonates, for example, calcium carbonate and sodium carbonate. See R. Lewis, Sr., Hawley's Condensed Chemical Dictionary, (12th Ed. 1993) at pages 761-762, and M. Silberberg, Chemistry The Molecular Nature of Matter and Change (1996) at page 586, which are specifically incorporated by reference herein.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In yet another alternative embodiment, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202, which are specifically incorporated by reference herein.

The particles suitable for use in the compositions of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example, boron nitride; specific, nonlimiting examples of metal oxides are, for example, zinc oxide; nonlimiting examples of suitable metal sulfides are, for example, molybdenum disulfide, tantalum disulfide, tungsten disulfide, and zinc sulfide; nonlimiting suitable examples of metal silicates are, for example, aluminum silicates and magnesium silicates such as vermiculite.

The particles can comprise, for example, a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. It should be understood that when the composition of the invention is employed as a transparent topcoat, for example, as a clearcoat in a multi-component composite coating composition, particles should not seriously interfere with the optical properties of the composition. As used herein, "transparent" means that the cured coating has a BYK Haze index of less than 50 as measured using a BYK/Haze Gloss instrument.

Nonpolymeric, inorganic materials useful in forming the particles of the present invention comprise inorganic materials selected from graphite, metals, oxides, carbides, nitrides, borides, sulfides, silicates, carbonates, sulfates, and hydroxides. A nonlimiting example of a useful inorganic oxide is zinc oxide. Nonlimiting examples of suitable inorganic sulfides include molybdenum disulfide, tantalum disulfide, tungsten disulfide, and zinc sulfide. Nonlimiting examples of useful inorganic silicates include aluminum silicates and magnesium silicates, such as vermiculite. Nonlimiting examples of suitable metals include molybdenum, platinum, palladium, nickel, aluminum, copper, gold, iron, silver, alloys, and mixtures of any of the foregoing.

In one embodiment, the present invention is directed to compositions as previously described wherein the particles are selected from fumed silica, amorphous silica, colloidal silica, alumina, colloidal alumina, titanium dioxide, cesium oxide, yttrium oxide, colloidal yttria, zirconia, colloidal zirconia, and mixtures of any of the foregoing. In another embodiment, the present invention is directed to compositions as previously described wherein the particles include colloidal silica. In some embodiments, the aforementioned materials can be surface treated or untreated. Other suitable materials from which the particles can be formed as well as other particle morphologies are described in U.S. Pat. No. 6,657,001, column 22, line 11, to column 23, line 52, the cited portion of which is incorporated herein by reference.

In certain embodiments, the particles have a hardness value that is described in U.S. Pat. No. 6,657,001, column 20, line 64, to column 22, line 4, the cited portion of which is being incorporated herein by reference.

In certain embodiments, the total amount of particles present in the coating composition disclosed herein can range from 0.01 weight percent to 75 weight percent, such as greater than 0.1 weight percent, greater than 0.5 weight percent, or greater than 5 weight percent, based on total weight of the resin solids of the components of the coating composition.
Component (e):

In some embodiments, the coating composition of the present invention further includes a film-forming material. Suitable film-forming materials that may be used as component (e) include, without limitation, acrylic polymers, polyester polymers, polyurethane polymers, polyamide polymers, polyether polymers, bisphenol A based epoxy polymers, polysiloxane polymers, copolymers thereof, or mixtures thereof. In certain embodiments, the film-forming material is different from (b).

In certain embodiments, the film-forming material comprises a reactive functional group such as a hydroxyl group, carboxylic acid group, isocyanate group, blocked isocyanate group, carboxylate group, primary amine group, secondary amine group, amide group, carbamate group, anhydride group, hydroxyl alkylamide group, epoxy group, or combinations thereof. It is noted that in some embodiments, the reactive functional group of the film-forming material, which can be the same or different from the reactive functional group of (b), can also be reactive toward component (c). In other embodiments, however, an additional curing agent, which is only reactive with the reactive functional group of the film-forming polymer, may be added to the coating composition of the present invention. Suitable curing agents that can be used include those described above in connection with component (c). In certain embodiments, the curing agent described in this paragraph may be the same or different from the curing agent described above.

In an embodiment of the present invention, the additional polymer having at least one reactive functional group, if employed, is generally present, when added to the other components in the composition, in an amount ranging form 1 weight percent to 90 weight percent, such as from 2 weight percent to 80 weight percent, from 5 weight percent to 60 weight percent, or from 10 weight percent to 50 weight percent, based on the total weight of the resin solids of the coating composition.
Other Components:

The coating composition described herein may further comprise additional ingredients such as colorants. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, or mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm Example nanoparticle dispersions and methods for making them are identified in U.S. Pat. No. 6,875,800. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which discreet "composite microparticles", which comprise a nanoparticle and a resin coating on the nanoparticle, is dispersed. Example dispersions of resin-coated nanoparticles and methods for making them are identified in United States Patent Application Publication 2005/0287348, U.S. Provisional Application No. 60/482,167, and U.S. patent application Ser. No. 11/337,062.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919.

In general, the colorant can be present in any amount sufficient to impart the desired visual and/or color effect. The colorant may comprise from 1.0 to 65 weight percent of the present compositions, such as from 3 to 40 weight percent or 5 to 35 weight percent, with weight percent based on the total weight of the compositions.

The coating compositions can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

Suitable catalysts that may be used include acid and basic catalyst known to those skilled in the art. Lewis acid and base catalysts, as well as organic acid and base catalysts, may be utilized in the present invention. For example, tin naphthenate, tin benzoate, tin octoate, tin butyrate, dibutyltin dilaurate, dibutyltin diacetate, dibutyltin oxide, lead octoate, aluminum ethyl acetoactetate, zirconium ethyl acetoacetate, and unblocked and blocked versions of dinonylnaphthalene disulfonic acid, dodecylbenzenesulfonic acid, p-toluenesulfonic acid, alkyl acid phosphate, phenyl acid phosphate, 1,4-diazabicyclo[2.2.2]octane (DABCO), triethylamine, guanine, pyridine, tetramethylguanidine, phosphonic and diphosphonic diesters, and the various blocked versions of the catalysts mentioned above.

In addition to the materials described above, the coating composition can also comprise an organic solvent. Suitable organic solvents that can be used in the coating composition include any of those listed in the preceding paragraphs as well as butyl acetate, xylene, methyl ethyl ketone, or combinations thereof.

Physical Properties:

In certain embodiments, the coating composition of the present invention, after application to a substrate and after curing, demonstrates a 20° gloss retention of at least 80%, such as greater than 90% (e.g., 90% to 95%), when subjected to ABRASION TESTING METHOD 1. The test begins by measuring the 20° gloss of the cured coating ("original gloss"), which has been applied onto a substrate, prior to subjecting the coated substrate to the Amtec-Kistler Car Wash Test DIN 55668. For each of the ABRASION TESTING METHODS described herein, the gloss measurement is taken by using a gloss meter such as the NOVO GLOSS-GARDCO gloss meter (available from Paul N. Gardner Co. of Pompano Beach, Fla.). After the gloss measurement is obtained, the coated substrate is then subjected to 10 cycles of the Amtec-Kistler Car Wash Test. After the 10 cycles are complete, the 20° gloss of the coating is again measured ("gloss after mar"). The 20° gloss retention of the coating is determined using formula (I) below:

(gloss after mar/original gloss)×100=gloss retention  (I)

In certain embodiments, the coating composition of the present invention, after application to a substrate and after curing, can demonstrate a 20° gloss retention of at least 70% (e.g., from 75% to 80%), such as greater than 80%, or greater than 90%, when subjected to ABRASION TESTING METHOD 2. ABRASION TESTING METHOD 2 is conducted in the same manner as ABRASION TESTING METHOD 1 but for the fact that the coated substrate is subjected to 40 cycles of the Amtec-Kistler Car Wash Test as opposed to 10 cycles.

In certain, the coating composition of the present invention, after being applied to a substrate as a coating and after curing, can demonstrate a 20° gloss retention of at least 80%, such as greater than 90% (e.g., 90% to 95%), when subjected to DRY ABRASION TESTING METHOD 1. In the DRY ABRASION TESTING METHOD 1, a cured coating on a substrate is subjected to testing by first measuring the 20° gloss of the coating ("original gloss"). The coating is then linearly scratched with a weighted abrasive paper for ten double rubs using an Atlas AATCC CROCKMETER, Model CM-5 (available from Atlas Electric Devices Company of Chicago, Ill.). The abrasive paper used is 3M 281Q WETORDRY™ PRODUCTION™ 9 micron polishing paper sheets, which are commercially available from 3M Company of St. Paul, Minn. After scratching, the coated substrate is heated to a substrate temperature of 35 to 60° C. for a duration of from 10 seconds up to overnight using any appropriate heat source such as a thermal or convection oven, liquid (i.e. warm water), heat gun, heat lamp, sunlight, other IR sources, hot-room and the like, and afterwards the 20° gloss ("gloss after mar") is again measured. A coating will pass the DRY ABRASION TESTING METHOD 1 if it retains at least 60% of its original 20° gloss. Gloss retention is measured as described in formula (I) above.

Coating System

The coating composition described above may be applied alone or as part of a coating system that can be deposited onto a number of different substrates. The coating system typically comprises a number of coating layers. A coating layer is typically formed when a coating composition that is deposited onto the substrate is substantially cured by methods known in the art (e.g., by thermal heating). It is noted that the coating composition described above can be used in one or more of the coating layers described in the following paragraphs.

Suitable substrates that can be coated with the coating composition comprising the polymer include, without limitation, metal substrates, metal alloy substrates, substrates that have been metallized, such as nickel plated plastic, and/or plastic substrates. In some embodiments, the metal or metal alloy can be aluminum and/or steel. For example, the steel substrate could be cold rolled steel, electrogalvanized steel, and/or hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989 or not pretreated with a pretreatment solution.

In a conventional coating system used in the automotive industry, a pretreated substrate is coated with an electrodepositable coating composition. Suitable electrodepositable coating compositions that may be used include those described in U.S. Pat. Pub. No. 2009/0042060. After the electrodepositable coating composition is cured, a primer-surfacer coating composition is applied onto a least a portion of the electrodepositable coating composition. The primer-surfacer coating composition is typically applied to the electrodepositable coating layer and cured prior to a subsequent coating composition being applied over the primer-surfacer coating composition. However, it should be noted that in some embodiments, the substrate is not coated with an electrodepositable coating composition. Accordingly, in these embodiments, the primer-surfacer coating composition is applied directly onto the substrate.

The primer-surfacer layer that results from the primer-surfacer coating composition serves to enhance chip resistance of subsequently applied coating layers (e.g., color imparting coating composition and/or substantially clear coating composition) as well as to aid in the appearance of the subsequently applied layers. As used herein, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. patent application Ser. No. 11/773,482.

It should be noted that in some embodiments, the primer-surfacer coating composition is not used in the coating system. Therefore, a color imparting basecoat coating composition can be applied directly onto the cured electrodepositable coating composition.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, the present invention can be used in a substantially clear coating composition (hereinafter, "clearcoat"), which is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured.

In some embodiments, a first portion of particles (e.g., component (d)), such as silica particles, is present in a surface region of the cured composition in a concentration which is higher than a concentration of a second portion of particles which is present in a bulk region of the cured clear coating composition (i.e., clearcoat layer). In certain instances, the BYK Haze value of the cured composition is less than 50, can be less than 35, and is often less than 20 as measured using a BYK Haze Gloss meter available from BYK Chemie USA. It should also be appreciated that, in certain embodiments, the clearcoat layer can also comprise a polymer network, which comprises the residue of an alkoxysilane compound (e.g., component (a)). In some embodiments, the polymer network is formed through the hydrolysis reaction of the alkoxysilane compound with itself. Accordingly, in certain embodiments, the clearcoat layer comprises a high concentration of silica particles in the surface region of the clearcoat layer while further comprising not only the polymer network described in the preceding sentence, but also a crosslinked network formed from the reaction of an isocyanate curing agent (e.g., component (c)) with the hydroxyl groups of a polysiloxanes (e.g., component (b)). While not wishing to be bound by a particular theory, it is believed that in some embodiments, the polymer network formed from component (a) can interpenetrate between the crosslinked network formed from the reaction of components (c) and (b) thereby increasing the physical properties of the resulting clearcoat layer. Alternatively, in embodiments wherein the coating composition further comprises a film-forming material (e.g., component (e)), such an acrylic polyol, then it is believed that the polymer network can interpenetrate between the crosslinked network formed from the reaction of component (c) and (b) in addition to the crosslinked network formed from the reaction of component (c) with (e).

As used herein "surface region" of the cured composition means the region which is generally parallel to the exposed air-surface of the coated substrate and which has thickness generally extending perpendicularly from the surface of the cured coating to a depth ranging from at least 20 nanometers to 150 nanometers beneath the exposed surface. In certain embodiments, this thickness of the surface region ranges from at least 20 nanometers to 100 nanometers, and can range from at least 20 nanometers to 50 nanometers. As used herein, "bulk region" of the cured composition means the region which extends beneath the surface region and which is generally parallel to the surface of the coated substrate. The bulk region has a thickness extending from its interface with the surface region through the cured coating to the substrate or coating layer beneath the cured composition.

In embodiments of the present invention in which the particles have an average particle size greater than 50 nanometers, the thickness of the surface region generally extends perpendicularly from the surface of the cured coating to a depth equal to three times the average particle size of the particles, and this surface can extend to a depth equal to two times the average particle size of the particles.

The concentration of particles in the cured coating can be characterized in a variety of ways such as those described in U.S. Pat. No. 6,657,001, column 47, lines 12-60, the cited portion which is incorporated herein by reference.

It should be understood that, in some embodiments, the particles can be present in the surface region such that a portion of the particles at least partially protrudes above the clearcoat layer, essentially unprotected by an organic coating layer. Alternatively, the particles can be present in the surface region such that this organic coating layer lies between the particles and the exposed air-surface interface of the surface region.

One or more of the coating compositions described in the preceding paragraphs can comprise the colorants and the other optional materials (which are known in the art of formulated surface coatings) described above.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 2K composition or multi-component composition will be understood as referring to a composition wherein various components are maintained separately until just prior to application. A 1K or 2K coating composition can be applied to a substrate and cured by any conventional means, such as by heating, forced air, and the like.

In certain embodiments, the present invention may be used in a monocoat coating system. In a monocoat coating system, a single coating layer is applied over a substrate (which can be pretreated or non-pretreated) that can comprise one or more of the following layers (as described above): an electrodepositable coating layer or a primer-surfacer coating layer.

The coating compositions that form the various coating layers described herein can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, one or more of the uncured coating compositions may be cured simultaneously.

The coating compositions may be cured using any technique known in the art such as, without limitation, thermal energy, infrared, ionizing or actinic radiation, or by any combination thereof. In certain embodiments, the curing operation can be carried out at temperatures ≥10° C. In other embodiments, the curing operation can be carried out at temperature ≤246° C. In certain embodiments, the curing operation can carried out at temperatures ranging between any combination of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In certain embodiments, the coating compositions described herein is a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

The dry film thickness of the coating layers described herein can range from 0.1 micron to 500 microns. In other embodiments, the dry film thickness can be ≤125 microns, such as ≤80 microns. For example, the dry film thickness can range from 15 microns to 60 microns.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example 1

This example describes the preparation of an alkoxysilane resin. The resin was prepared as follows:

792.1 g of 3-aminopropyl trimethoxysilane was added to a suitable reaction vessel equipped with a reflux condenser and which was flushed with a nitrogen blanket. At room temperature, 442.4 g of ethyl acrylate was slowly introduced at a rate to keep temperature below 60° C. After addition was completed, the reaction was held at 60° C. until the reaction was completed (i.e., percent ethyl acrylate is <1%). The reaction mixture was then cool to room temperature and 61.7 g n-butyl acetate was then added to the reaction mixture. 710.8 g DESMODUR N 3300A (available from Bayer MaterialScience) was then slowly introduced into the reaction mixture. The reaction mixture was not allowed to exceed 65° C. and was maintained at a temperature of 65° C. and monitored by infrared spectroscopy for disappearance of the isocyanate absorption band.

Coating Compositions

The following examples describe the preparation of a coating composition of the present invention, as well as comparative coating composition. Both compositions were sued to form a transparent topcoat (e.g., clearcoat layer) in a multi-component composite coating system.

The coating compositions, Example A (Comparative) and Example B, were prepared in a manner as described in Example 20 of U.S. Pat. No. 6,657,001. The alkoxysilane resin of Example 1, however, was added only to Example B at 20 weight grams while no alkoxysilane resin was added to Example A.

Each of the above coating compositions of Examples A and B was prepared as a two-pack coating composition.

Test Panel Preparation

Obsidian Schwartz, a black waterborne basecoat (commercially available from PPG Industries—Germany, Inc.) was spray applied at 12.5 µm to steel panels (10 mm×30 mm) coated with ED6060C, cationic electrodepositable primer commercially available from PPG Industries, Inc. The base-coated panels were hydrolyzed for 5 minutes at 82° C. Each of the coating compositions of Examples A and B above was applied at 40 µm as a transparent topcoat over the base-coated panels. The topcoated panels were flashed for 10 minutes at ambient temperature, and then thermally cured for 30 minutes at 140° C. The multi-component composite coatings were tested for various physical properties including gloss and scratch resistance (depicted in Table 1 below).

Test Results

TABLE 1

| | | Gloss Retention (%) after Abrasion | | |
|---|---|---|---|---|
| Example | 20° Gloss (Initial) | Test Method 1 Dry Abrasion Testing Method 1 | Abrasion Testing Method 1 | Abrasion Testing Method 2 |
| A (Comparative) | 86 | 83% | 87% | 63% |
| B | 87 | 94% | 94% | 82% |

As can be seen from Table 1, Example B (an embodiment of the present invention), had improved physical properties when compared to a coating composition that did not have the components disclosed herein.

What is claimed is:
1. A coating composition comprising:
(a) a compound comprising one or more of:
(Ia) a (poly)urethane, a (poly)urea, a (poly)epoxy, a (poly)sulfide, a (poly)amine, or combinations thereof, said compound comprising a reactive group of formula (I)

$$—X—SiR''_x(OR')_{3-z}\qquad (I)$$

wherein X is a hydrocarbon chain; wherein x=0 to 2 and z=0 to 2; wherein each R' and R'' comprises independently hydrogen, a halogen, an amide, a hydrocarbon chain, carboxy, alkoxy, a hydrocarbon chain comprising a heteroatom, and/or a hydrocarbon chain comprising a carbonyl group; and wherein when x is 2, then each R'' may be the same or different; and wherein when z is 0 or 1, then each R' may be the same or different; and wherein R'' and R' may be the same or different;
(Ib) a compound having the structure:

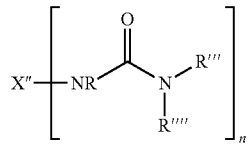

wherein R is hydrogen, a hydrocarbon chain, a hydrocarbon chain comprising a heteroatom, and/or a hydrocarbon chain comprising a carbonyl group; wherein at least one of R''' and R'''' is —X—SiR''x(OR')3-z and wherein R''' and R'''', which may be the same or different, comprises hydrogen, a hydrocarbon chain, a hydrocarbon chain comprising a heteroatom, a hydrocarbon chain comprising a carbonyl group, a (poly)ester, a (poly)urethane, an isocyanurate, a (poly)urea, a (poly)epoxy, an anhydride, an acrylic, a (poly)ether, a (poly)sulfide, a (poly)amine, or combinations thereof; wherein X is a hydrocarbon chain; wherein x=0 to 2 and z=0 to 2; wherein R' and R'', comprises hydrogen, a halogen, an amide, a hydrocarbon chain, carboxy, alkoxy, a hydrocarbon chain comprising a heteroatom, and/or a hydrocarbon chain comprising a carbonyl group; and wherein when x is 2, then each R'' may be the same or different; and wherein when z is 0 or 1, then each R' may be the same or different; wherein X'' is a hydrocarbon chain, a (poly)ester, a (poly)urethane, an isocyanurate, a (poly)urea, a (poly)epoxy, an anhydride, an acrylic, a (poly)ether, a (poly)sulfide, and/or a (poly)amine; and wherein n is ≥1; and
(Ic) a compound having the structure:

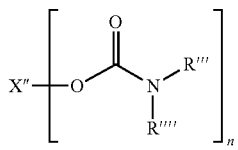

wherein R is hydrogen, a hydrocarbon chain, a hydrocarbon chain comprising a heteroatom, and/or a hydrocarbon chain comprising a carbonyl group; wherein at least one of R''' and R'''' is —X—SiR''x(OR')3-z and wherein R''' and R'''', which may be the same or different, comprises hydrogen, a hydrocarbon chain, a hydrocarbon chain comprising a heteroatom, a hydrocarbon chain comprising a carbonyl group, a (poly)ester, a (poly)urethane, an isocyanurate, a (poly)urea, a (poly)epoxy, an anhydride, an acrylic, a (poly)ether, a (poly)sulfide, a (poly)amine, or combinations thereof; wherein X is a hydrocarbon chain; wherein and x=0 to 2 and z=0 to 2; wherein R' and R'', comprises hydrogen, a halogen, an amide, a hydrocarbon chain, carboxy, alkoxy, a hydrocarbon chain comprising a heteroatom, and/or a hydrocarbon chain comprising a carbonyl group; and wherein when x is 2, then each R'' may be the same or different; and wherein when z is 0 or 1, then each R' may be the same or different; wherein X'' is a hydrocarbon chain, a (poly)ester, a (poly)urethane, an isocyanurate, a (poly)urea, a (poly)epoxy, an anhydride, an acrylic, a (poly)ether, a (poly)sulfide, and/or a (poly)amine; and wherein n is ≥1;
(b) a polysiloxane comprising one or more of structures (II) and (III):

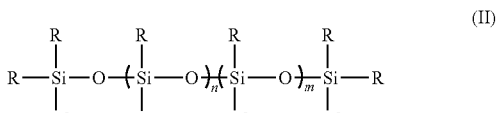

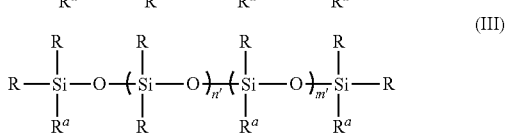

wherein m=≥1; m' ranges from 0 to 75; n ranges from 0 to 75; n' ranges from 0 to 75; each R, which may be identical or different, is selected from hydrogen, hydroxyl, a hydrocarbon chain, a siloxane chain, and mixtures of any of the foregoing; and —Ra comprises the following structure (IV):

$$R^3—Q\qquad (IV)$$

wherein —$R^3$ is selected from an alkylene group, an oxyalkylene group, and an alkylene aryl group; and Q is a reactive functional group selected from a hydroxyl group, a carboxyl group, an isocyanate group; a blocked polyisocyanate group, a primary amine group, a secondary amine group, an amide group, a carbamate group, a urea group, a urethane group, a vinyl group, an unsaturated ester group, a maleimide group, a fumarate group, an onium salt group, an anhydride group, a hydroxyl alkylamide group, and an epoxy group;
(c) a reactant comprising a functional group that is reactive with component (b), wherein said reactant comprises a curing agent selected from the group consisting of an aminoplast resin, a polyisocyanate, a blocked isocyanate, a polyepoxide, a polyacid, a polyol, or combinations thereof; and
(d) a plurality of particles comprising inorganic particles, composite particles, or mixtures thereof.

2. The coating composition according to claim 1, wherein R' and R" each comprise an alkyl group of 1 to 6 carbons and wherein R' and R" are the same or different.

3. The coating composition according to claim 1, wherein X comprises 2 to 6 carbon atoms.

4. The coating composition according to claim 1, wherein the coating composition comprises 1.0 weight % to 50 weight % of component (a) based on the total resin solids of the coating composition.

5. The coating composition according to claim 1, wherein the particles of component (d) comprise silica, amorphous silica, colloidal silica, alumina, colloidal alumina, titanium oxide, cesium oxide, yttrium oxide, colloidal yttria, zirconia, colloidal zirconia, or combinations thereof.

6. The coating composition according to claim 1, wherein the particles of component (d) have an average particle size of less than 1000 nanometers.

7. The coating composition according to claim 1, wherein the particles of component (d) have an average particle size of less than 100 microns.

8. The coating composition according to claim 1, further comprising (e) a film-forming material comprising acrylic polymers, polyester polymers, polyurethane polymers, polyamide polymers, polyether polymers, bisphenol A based epoxy polymers, polysiloxane polymers, copolymers thereof, or mixtures thereof; wherein the film-forming material is different from (b); and wherein the film-forming material comprises a reactive functional group that is reactive with component (c).

9. The coating composition according to claim 8, further comprising a curing agent that is reactive with the reactive functional group of the (e) film-forming material; and wherein the curing agent is the same or different from component (c).

10. The coating composition according to claim 9, wherein the curing agent comprises aminoplast resin, an isocyanate, a polyepoxide, a polyacid, an anhydride, an amine, a polyol, or combinations thereof.

11. The coating composition according to claim 1, wherein after application to a substrate and cure, the cured coating demonstrates a 20° gloss retention of at least 80% when subjected to ABRASION TESTING METHOD 1.

12. The coating composition according to claim 1, wherein after application to a substrate and cure, the cured coating demonstrates a 20° gloss retention of at least 70% when subjected to ABRASION TESTING METHOD 2.

13. The coating composition according to claim 1, wherein after application to a substrate and cure, the cured coating demonstrates a 20° gloss retention of at least 80% when subjected to DRY ABRASION TESTING METHOD 1.

* * * * *